US012703490B2

(12) United States Patent
Boissy et al.

(10) Patent No.: US 12,703,490 B2
(45) Date of Patent: Aug. 11, 2026

(54) COMBINED DE-ICING DEVICE

(71) Applicant: SAFRAN AEROSYSTEMS, Plaisir (FR)

(72) Inventors: Loïc Boissy, Moissy-Cramayel (FR); Romain Duperrier, Moissy-Cramayel (FR)

(73) Assignee: SAFRAN AEROSYSTEMS, Plaisir (FR)

(*) Notice: Subject to any disclaimer, the term of this patent is extended or adjusted under 35 U.S.C. 154(b) by 0 days.

(21) Appl. No.: 18/701,543

(22) PCT Filed: Oct. 12, 2022

(86) PCT No.: PCT/FR2022/051920

§ 371 (c)(1),
(2) Date: Apr. 15, 2024

(87) PCT Pub. No.: WO2023/067266

PCT Pub. Date: Apr. 27, 2023

(65) Prior Publication Data

US 2024/0409223 A1 Dec. 12, 2024

(30) Foreign Application Priority Data

Oct. 19, 2021 (FR) ........................................ 2111073

(51) Int. Cl.
*B64D 15/12* (2006.01)

(52) U.S. Cl.
CPC .................................... *B64D 15/12* (2013.01)

(58) Field of Classification Search
CPC ....... B64D 15/16; B64D 15/166; B64D 15/20
See application file for complete search history.

(56) References Cited

U.S. PATENT DOCUMENTS 4,865,291 A * 9/1989 Briscoe .................. B64D 15/16 60/411
5,904,322 A * 5/1999 Giamati ............... B64D 15/166 244/134 B (Continued)

FOREIGN PATENT DOCUMENTS

EP 3 342 711 A1 7/2018
WO 2015/110974 A1 7/2015

OTHER PUBLICATIONS

International Search Report mailed Dec. 23, 2022, issued in corresponding International Application No. PCT/FR2022/051920, filed Oct. 12, 2022, 5 pages.

(Continued)

*Primary Examiner* — Michael H Wang
(74) *Attorney, Agent, or Firm* — CHRISTENSEN O'CONNOR JOHNSON KINDNESS PLLC

(57) ABSTRACT

A device deices an aerodynamic profile that has a lower surface, a plurality of unitary cavities delimited by a lattice of partitions on the lower surface, and a barrier arranged on the lattice of partitions. The surface includes a first plurality of holes which connect the unitary cavities to a device for generating a negative pressure in the cavities simultaneously so as to press the barrier onto the lattice of partitions. A second plurality of holes connect the unitary cavities to a device for generating one or more pressure pulses in at least some of the selected unitary cavities. The barrier is equipped with one or more resistive networks positioned below the barrier in line with some of the cells in order to create localized electrothermal deicing zones in the device.

5 Claims, 4 Drawing Sheets

(56) References Cited

U.S. PATENT DOCUMENTS

| | | | | |
|---|---|---|---|---|
| 5,921,502 | A * | 7/1999 | Al-Khalil | B64D 15/163<br>244/134 A |
| 6,129,314 | A * | 10/2000 | Giamati | B64D 15/163<br>244/134 A |
| 6,283,411 | B1 * | 9/2001 | Giamati | B64D 15/12<br>244/134 A |
| 10,124,902 | B2 * | 11/2018 | Hull | B64D 15/22 |
| 10,457,405 | B1 * | 10/2019 | Hardman | B32B 7/025 |
| 2003/0122037 | A1 * | 7/2003 | Hyde | B64D 15/166<br>244/134 A |
| 2016/0325842 | A1 * | 11/2016 | Boissy | B64D 15/166 |
| 2018/0192476 | A1 * | 7/2018 | Chaudhry | H05B 3/145 |
| 2020/0140097 | A1 * | 5/2020 | Slane | B64D 15/12 |

OTHER PUBLICATIONS

Written Opinion mailed Dec. 23, 2022, issued in corresponding International Application No. PCT/FR2022/051920, filed Oct. 12, 2022, 7 pages.

* cited by examiner

COMBINED DE-ICING DEVICE

FIELD OF THE DISCLOSURE

The disclosure relates to the field of deicing devices for aircraft and more particularly to devices for deicing wing elements or air inlets of aircraft turbomachines.

BACKGROUND

Various Deicing Techniques Exist for the Wing Elements or Air Inlets of Turbomachines. In Particular, there is:

- Pneumatic technology which uses the inflation of rubber or elastomer elements on the surface of a wing element, to break up and expel the ice formed on the element. The inflation height traditionally encountered in this technology is around 6 mm and the inflation time is around 5 seconds. This technology is limited in that it degrades the aerodynamic performance of the element that receives it, and it does not always succeed in removing all ice from the protected surface.
- The use of electric heating elements. This technology has no limitations in terms of deicing but consumes a lot of electrical power, especially on large surfaces to be deiced.
- The use of the hot air generated by the turbomachine. This technique has no limitation in terms of deicing but is not thermally optimized when emitting the hot air. In addition, because the air temperature is not controlled, the temperatures reached require the use of very heat-resistant materials such as titanium for the deiced surfaces and this technology cannot be used on composite materials that it could damage.
- The use of a deicing fluid poured onto the wings to prevent the formation of or to remove ice via a chemical effect. This technology is not good for the environment, and is not optimal in terms of operating cost and onboard weight.

Furthermore, document WO2015/110974 A1 relates to a pressure pulse-based deicing device comprising a plurality of unitary cells on a surface of an aircraft, each provided with at least a first orifice connected to a vacuum line for delivering negative pressure to the cells collectively and at least a second orifice connected to a pressure source for introducing a fluid under pressure into the cells individually, the cells being covered with a semi-rigid protective waterproof sheet.

The unitary cells are organized into rows and columns and separated by boundary partitions forming a lattice around the cells. The protective sheet presses against the boundary partitions via the application of negative pressure to all the cells.

To carry out a deicing sequence, a pressure pulse is applied to some of the cells and propagated in a wave over the entire surface of the device.

This technique, which is based on rapid propagation of a localized deformation of the protective sheet, is effective for surfaces with a large radius of curvature, whether they are convex or concave, but cannot be used on convex or concave surfaces which have a small radius of curvature because a small radius of curvature obstructs the deformation of the protective sheet.

Also, there is no completely satisfactory technology for preventing ice formation on the surfaces of aircraft wing elements or of turbomachine air inlets, these surfaces having shapes with varied or complex curvatures.

SUMMARY

In view of the prior art, this disclosure proposes integrating one or more resistive heating elements into a pressure pulse-based device in order to create a hybrid deicing device combining a technique with pressure pulses under a membrane which forms an anti-erosion barrier on the surface of the aerodynamic profile, and a technique with localized electric heating elements. The hybrid deicing device is thus easy to install and the combination of the technique with pressure pulses and the technique with electric heating elements located at particular locations makes it possible to increase the deicing efficiency by a synergy effect.

More precisely, this disclosure proposes a device for anti-icing or deicing an aerodynamic profile, which may be a leading edge of a wing or wing element or which may be the lip of a turbomachine air inlet, the device comprising a first surface referred to as a lower surface, a plurality of cells formed of unitary cavities delimited by a lattice of partitions on the first surface and a barrier arranged on the lattice of partitions, wherein the first surface comprises a first plurality of holes connecting the unitary cavities to a negative pressure generation device for generating negative pressure in the cavities simultaneously so as to press the barrier onto the lattice of partitions, and a second plurality of holes connecting the unitary cavities to a pressure pulse-based device for generating one or more pressure pulses in at least some of the selected unitary cavities, wherein the barrier is equipped with one or more resistive networks positioned under the barrier and in line with some of the cells in order to create localized electrothermal deicing zones in the device.

Integration of the one or more resistive networks under the barrier makes it possible to optimize integration of the device on an aircraft and to optimize deicing the aerodynamic profile.

The features set forth in the following paragraphs correspond to embodiments that may be implemented independently of each other or in combination with each other:

According to a first embodiment, the one or more resistive networks may be composed of flexible circuits provided with conductive tracks forming meanders on the flexible circuits.

The resistive networks may comprise power supply connections, passing through some of the cells or running along the edges of the device and connecting the networks to an electric generator.

According to a second embodiment, the one or more resistive networks may be composed of conductive tracks directly formed in meanders on part of the barrier which then constitutes the substrate of a flexible printed circuit comprising the networks.

The barrier may comprise power supply tracks for the one or more resistive networks, for connection to an electric generator.

The one or more resistive networks may cover some of the cells arranged in zones having the smallest radius of curvature of the profile.

The one or more resistive networks may in particular be located at cells which cover a leading edge of an aerodynamic profile creating the zones of smallest radius of curvature, the device with cells devoid of resistive networks extending into zones of greater radius of curvature beyond the leading edge on both sides of the leading edge.

This disclosure further relates to a method for deicing a surface of an aerodynamic profile of an aircraft comprising a deicing device as described above, wherein the negative pressure generation device is activated and then a sequence of deicing by supplying power to the one or more resistive networks is begun so as to deice the zone(s) equipped with the networks, thus constituting ice breakage initiation zones in the ice deposited on the surface, then pressure pulses are created at the zones of the surface devoid of resistive networks in order to detach the ice accumulated on the profile.

As the device comprises a resistive network arranged at a leading edge of the aerodynamic profile and a surface, provided with cells devoid of a resistive network, that is in continuity with the leading edge, the method may be such that the heating power of the network is adapted according to the speed of the aircraft and the external temperature so as to create freezing droplets on the surface comprising the cells, the freezing droplets being expelled from the surface comprising the cells by the pressure pulse-based device.

The method may be such that the pressure pulse-based device generates pressure pulses in waves starting from cells contiguous to the resistive network and extending to the cells more distant from the resistive networks.

DESCRIPTION OF THE DRAWINGS

Other features, details, and advantages of the disclosure will become apparent upon reading the detailed description below of some non-limiting exemplary embodiments, and upon analysis of the appended drawings, in which.

DETAILED DESCRIPTION

The drawings and the description below contain elements which not only may serve to provide a better understanding of this disclosure, but also contribute to its definition, where appropriate.

Figure 2:
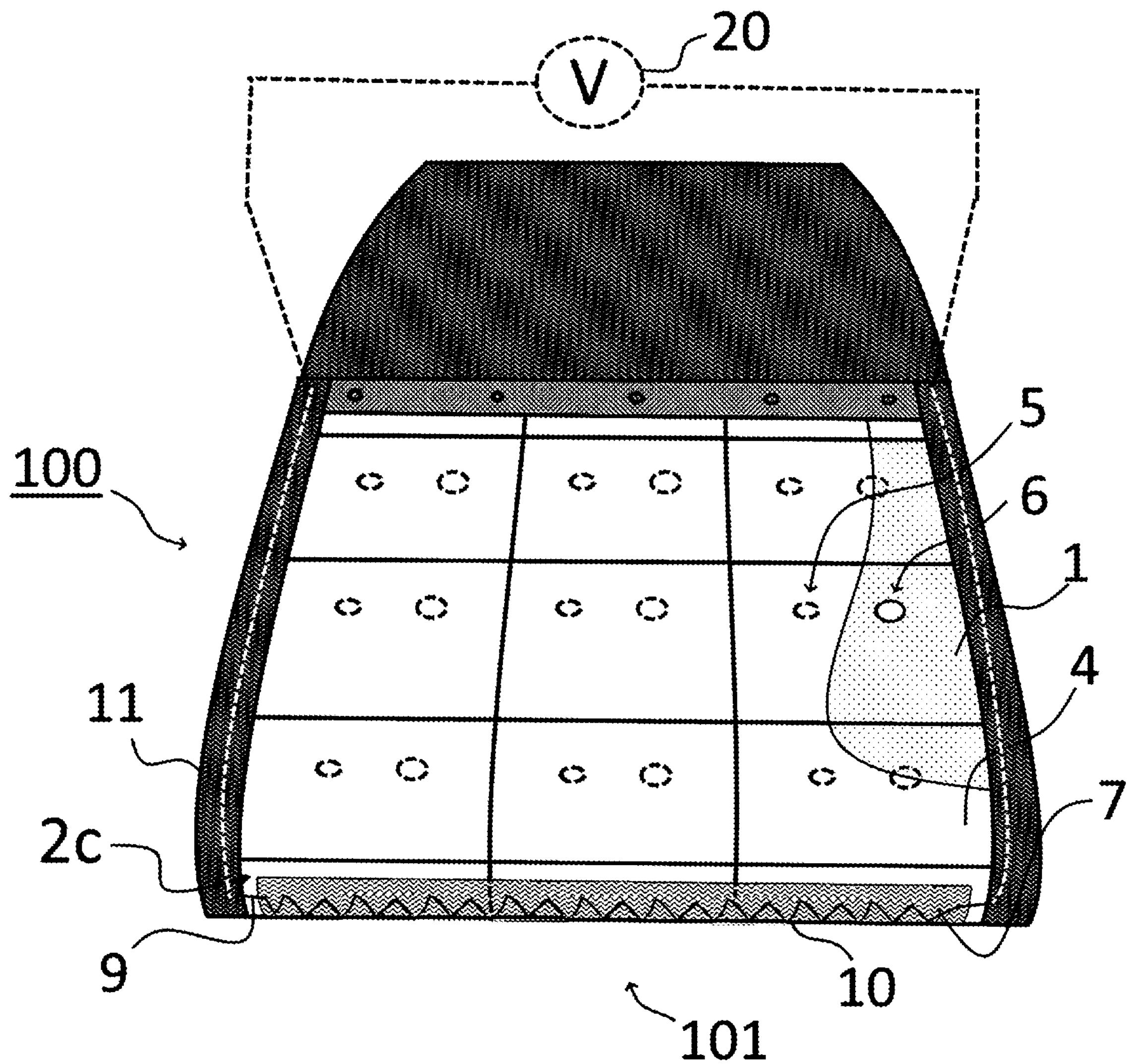
FIG. 2 shows a front perspective section view of a first example of an aerodynamic profile provided with a first example of the device of this disclosure.
Figure 3:
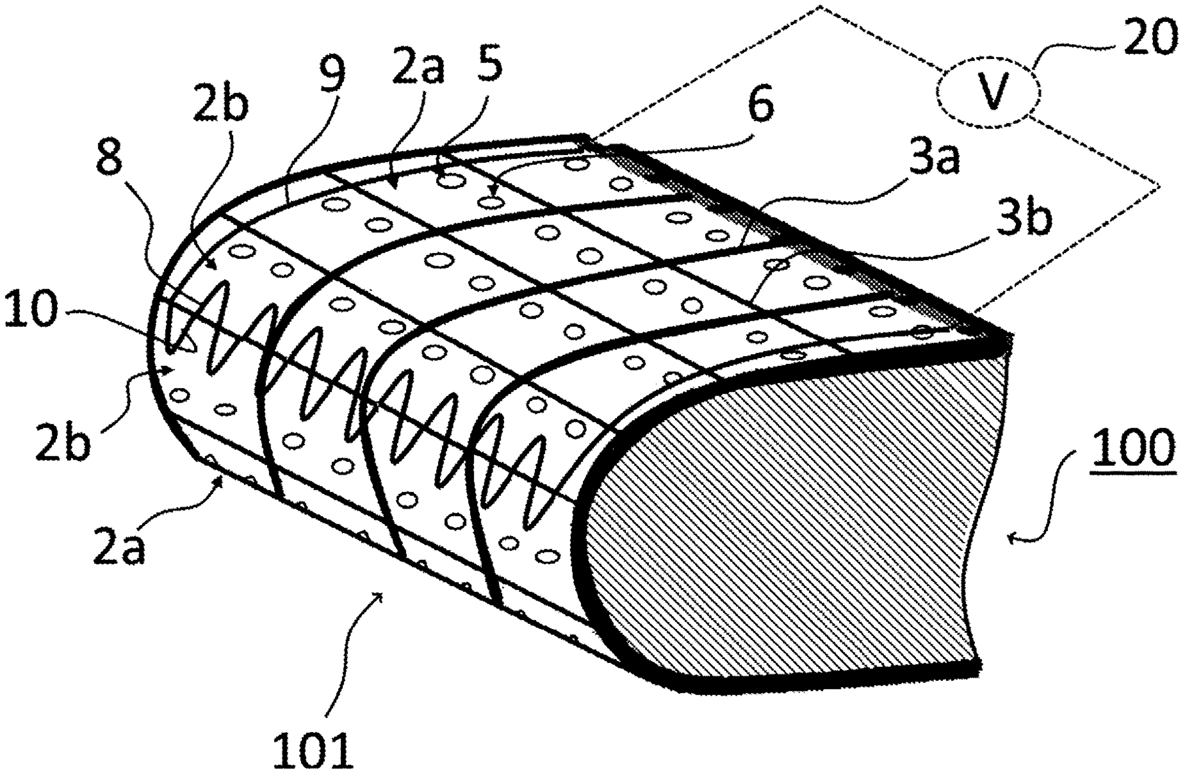
FIG. 3 shows a side perspective section view of an example of an aerodynamic profile provided with a second example of the device of this disclosure.

This disclosure proposes a device for anti-icing or deicing an aerodynamic profile 100, a section of the profile being shown in FIGS. 2 and 3, for example an aircraft wing, the deicing applied in particular to a surface of the profile around a leading edge 101 of this profile.

Figure 4:
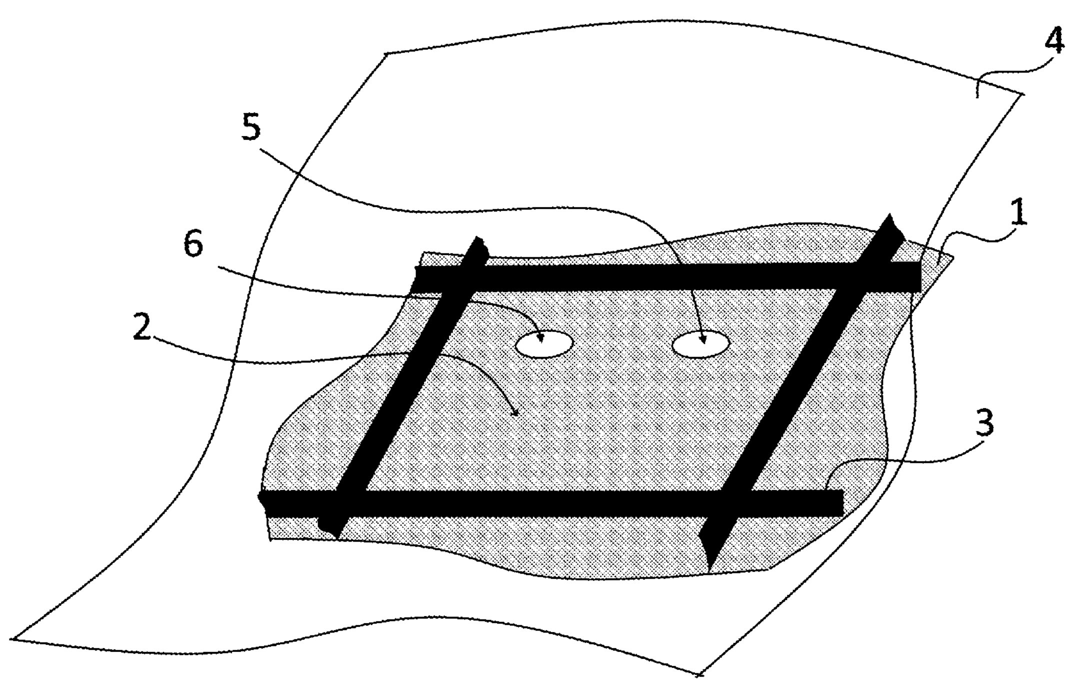
FIG. 4 shows details of a cell of this disclosure.

The deicing device comprises, according to FIG. 4 which provides a detailed view, a first surface 1 referred to as a lower surface, a plurality of unitary cavities 2 having a length in a direction parallel to the leading edge of 70 mm to 140 mm, a width in a direction perpendicular to the leading edge of between 50 mm and 100 mm, and a height of about 0.2 mm to 1 mm. These cells are defined by a lattice of partitions 3 on the first surface and a skin or barrier 4, in particular an anti-erosion barrier, placed on the lattice of partitions.

To create the partitions, it is possible to excavate cavity shapes in the surface, which forms partitions around the excavated portions; it is also possible to place a lattice of seals on the surface; or it is possible to arrange a lattice made of polymer or elastomer in which the mesh forms the cavities on the first surface; or these methods may be combined. The cavities may be excavated in the first surface so as to have a height preferably between 0.2 mm to 1 mm, and so the partitions have a width of around 2 mm to 3 mm. A flexible seal may be placed on the top of the partitions or may form them.

Figure 1:
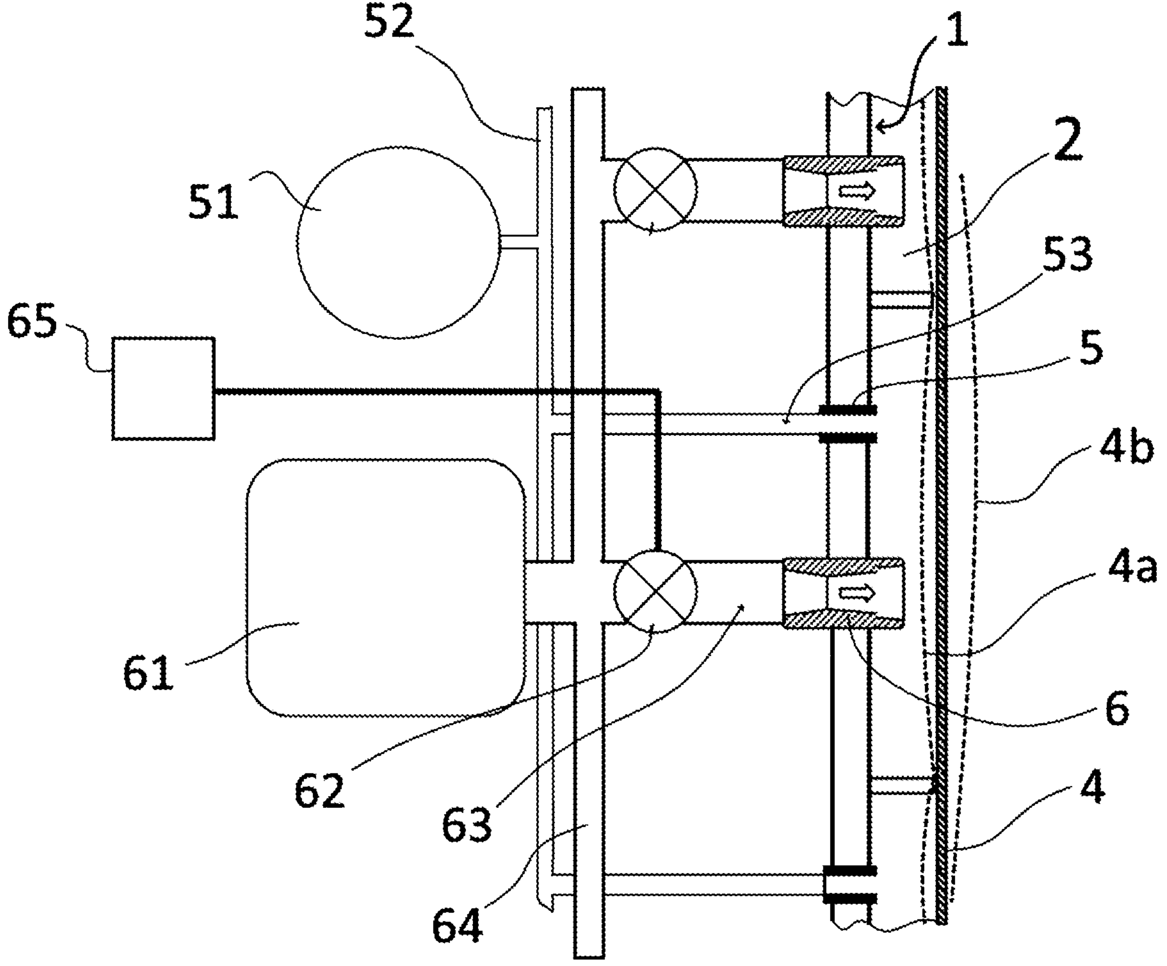
FIG. 1 shows a schematic view of cells in a cross-sectional side view and of devices for generating pressure and negative pressure.

The first surface further comprises a first plurality of holes 5, connecting the cavities to a negative pressure generation device as shown in FIG. 1 which comprises a negative pressure generator 51, a network of distributor pipes 52, tubes 53 with end pieces that lead into holes 5 of cavities 2. The negative pressure generator is connected to all of the cavities in order to generate negative pressure simultaneously in the cavities, so that anti-erosion barrier 4 is pressed against the lattice of partitions as indicated by the dotted line 4*a*.

The first surface further comprises a second plurality of holes 6, connecting the unitary cavities to a device for generating one or more pressure pulses. This device comprises a pressure generator 61, a distribution network 64, one solenoid valve 63 per cell or per row of cells which are arranged perpendicularly to the direction of air flow over the surface, and one tube 63 per cell connected to hole 6 in the cell. This device allows injecting pressure pulses adapted to move the anti-erosion barrier away from the top of the partitions by approximately 2 mm to 3 mm, symbolized by the dotted line 4*b* in FIG. 1, in the form of a pressure pulse having a duration of about 50 ms to 500 ms and in particular about 250 ms at the selected cavities. The pressure may be injected line-abreast perpendicularly to the direction of airflow near the leading edge of the aerodynamic profile and then propagated on the profile so as to gradually release the ice.

Thus, unlike a traditional pneumatic system, the device of this disclosure is completely integrated into the structure and is not overly thick. This makes it possible to maintain the aerodynamic profile and therefore not degrade the fine-tuned maneuvering of the aircraft. Furthermore, traditional pneumatic systems remain inflated for approximately 5 seconds during deicing phases, which has a detrimental effect on aerodynamic performance, whereas with this device the deicing pulses last between 50 ms and 500 ms and in particular about 250 ms.

The anti-erosion barrier is a semi-rigid membrane 4 whose rigidity is adapted to allow it to be placed against the tops of the partitions, following the profile, and rising when the pressure pulse is applied, but sufficiently rigid not to flex or vibrate under the aerodynamic stresses undergone by the profile. It may be made from a thin metal sheet, a material such as a composite of fiberglass or carbon fiber and resin, or an opaque thermoplastic material such as PEEK, PA, PPS, PPSU, PPA, PI, or advantageously PEI. Depending on the material, the semi-rigid membrane forming the anti-erosion barrier will have a thickness of around 0.8 to 2 mm, adapted to allow it to deform as it presses against the partitions when negative pressure is being generated and to move by 1 to 3 mm when pressure pulses are applied. For a material such as PEI, the chosen thickness of the semi-rigid membrane is about 0.8 mm.

In the context of the disclosure, the anti-erosion barrier is equipped with one or more resistive networks or electrothermal networks, hereinafter resistive networks, positioned under the anti-erosion barrier and in line with some of the cells in order to create localized electrothermal deicing or anti-icing zones in the device.

According to the example in FIG. 2, the resistive network is composed of a flexible circuit 7 provided with conductive tracks forming meanders 10 on the flexible circuit. For example, a traditional heat-resistant thermoplastic flexible circuit may be used. The conductive tracks will preferably be arranged on the side of the flexible circuit that faces the anti-erosion barrier in order to electrically insulate them from the cells and partitions.

The resistive network comprises electrically insulated power supply connections 9 here connecting to an electrical generator 20 external to the device by passing under edging 11 surrounding the device.

In the example of FIG. 3, the resistive network is formed by means of conductive tracks 8 directly formed as meanders 10 on part of the membrane forming anti-erosion barrier 4 which itself constitutes the substrate of a flexible circuit comprising the network. In this case, the membrane will be made of a material suitable for receiving these conductive tracks which may be created using traditional techniques based on materials conventionally used in the manufacture of networks, such as inconel, stainless steel, or constantan, or in the manufacture of electronic tracks deposited on the membrane.

In this case, the membrane in which the tracks of the resistive network will further be covered with a varnish or a layer of electrically insulating material also comprises the power supply tracks 9 of the one or more resistive networks which will also be connected to an electric generator 20 external to the device, for example via insulated electric wires connected to the membrane.

According to FIG. 2 or 3, one or more resistive networks 7 or 8 cover cells 2*b* arranged in zones of the surface that have the smallest radius of curvature.

The zones of smallest radius of curvature are composed here of the leading edge of a wing element, the device with cells devoid of resistive networks extending according to FIG. 3 beyond the leading edge on the upper and lower face of the wing element. This makes it possible to use pressure pulses above and below the leading edge which will be deiced by the resistive network-based device with no break in continuity, since the resistive network-based device is integrated under the anti-erosion barrier of the cell- and pressure pulse-based device.

Cells 2*b* may or may not be provided with suction holes for suction by the negative pressure generation device and may or may not be provided with holes connected to the pressure pulse generation device, for example depending on the curvature of the aerodynamic profile and whether or not it allows the anti-erosion barrier to lift from the partitions.

This integration of the resistive network-based device into the cell-based device makes it possible to increase the quality of the deicing, for example by sequencing the deicing methods and still using the cells near the leading edge with the pressure pulse generation device even if the curvature of the anti-erosion barrier reduces the effectiveness of these pulses by limiting the height of the barrier movement.

An additional advantage is to be able to design the resistive network for the best possible energy consumption, and for example a resistive network releasing 1.5 W/cm$^2$ and having a width of 20 to 100 mm per leading edge will be adapted to different types of profiles and flight conditions.

For use of the device as described herein, the negative pressure generation device is activated when the flight begins in order to press the anti-erosion barrier against the partitions, then when ice appears, a deicing sequence is started by supplying power to resistive network(s) 7 or 8 depending on the configuration, so as to deice the zone(s) equipped with the resistive networks thus constituting the ice breakage initiation zones for the ice deposited on the surface, then pressure pulses are created at the zones of the surface devoid of resistive networks in order to detach the ice accumulated on the profile. The fact that the anti-erosion barrier is equipped with the resistive device means that there is continuity between the zone deiced by the resistive device and the zone deiced by the pressure pulse-based device.

This continuity also makes it possible to use the resistive network arranged at a leading edge of the aerodynamic profile to prevent the capture or accumulation of ice in the zone protected by the heating solution and to create a runoff of melted ice which will refreeze in a zone of mechanical deicing, the displaced ice then being easily expelled by the pressure pulse process.

To do so, the heating power of the network may be adapted according to the speed of the aircraft and the external temperature so that the droplets freeze at a preferred distance from the leading edge, on the zone provided with cells, and are expelled by the pressure pulse-based device from the surface comprising the cells.

It is also possible with a solenoid valve control device 62 such as a computer 65 having suitable programming for generating pressure pulses timed in waves starting from the cells contiguous to the resistive network and extending to the cells further away from the resistive networks.

To clarify these concepts, the anti-icing and deicing device of this disclosure may have a ratio of 80% surface area covered by the pressure pulse-based device and 20% surface area equipped with resistive networks, which allows dividing the power density by 4.5 compared to electrothermal anti-icing, or even a ratio of 90% surface area covered by the pressure pulse-based device and 10% by electrothermal resistive networks, which allows dividing the power density by 9 compared to pure electrothermal anti-icing.

The deicing is effective. Such a configuration combines reduced weight and reduced electrical consumption.

For manufacturing the device, the anti-erosion barrier applied to the cells will have its perimeter glued and riveted underneath a frame of the device.

The disclosure is not limited to the examples described above, and in particular the surface of the device may be different from that shown, and the aerodynamic profile may be other than a wing element and may in particular be an air inlet or a non-developable 3D shape such as a double curvature of a reactor nacelle.

The invention claimed is:

1. A method for deicing a surface of an aerodynamic profile of an aircraft comprising a deicing device for deicing an aerodynamic profile, the deicing device comprising a lower surface, a plurality of cells formed of unitary cavities delimited by a lattice of partitions on said lower surface, and a barrier arranged on the lattice of partitions, wherein said lower surface comprises a first plurality of holes connecting said unitary cavities to a negative pressure generation device configured to generate negative pressure in said cavities simultaneously so as to press the barrier onto the lattice of partitions, and a second plurality of holes connecting said unitary cavities to a pressure pulse-based device configured to generate one or more pressure pulses in at least some of the selected unitary cavities, wherein the barrier is equipped with one or more resistive networks positioned under said barrier and in line with some of said cells in order to create localized electrothermal deicing zones in said device, the method including the steps of activating the negative pressure generation device and then supplying power to the one or more resistive networks so as to deice the zone(s) equipped with said networks, thus constituting ice breakage initiation zones in the ice deposited on said surface, then creating pressure pulses at the zones of said surface devoid of resistive networks in order to detach the ice accumulated on said profile.

2. The method according to claim 1, wherein the deicing device comprises a resistive network arranged at a leading edge of said aerodynamic profile and a surface, provided with cells devoid of a resistive network, that is in continuity with said leading edge, the heating power of said network is adapted according to the speed of the aircraft and the external temperature so as to create freezing droplets on the surface comprising said cells, said freezing droplets being expelled from the surface comprising said cells by the pressure pulse-based device.

3. The method according to claim 1, wherein the pressure pulse-based device generates pressure pulses in waves starting from the cells contiguous to the resistive network and extending to the cells more distant from said resistive networks.

4. The method according to claim 3, wherein the one or more resistive networks are located at cells facing a leading edge of an aerodynamic profile creating zones of smallest radius of curvature, the device with cells devoid of resistive networks extending into zones of greater radius of curvature beyond said leading edge on both sides of said leading edge.

5. The method according to claim 1, wherein said one or more resistive networks being composed of one or more flexible circuits provided with resistive conductive tracks forming meanders on said flexible circuits, said deicing device has a ratio of 80% to 90% surface area covered by the pressure pulse-based device cells and said deicing device has 20% to 10% surface area equipped with said one or more resistive networks, the one or more resistive networks covering some of said cells arranged in zones having a smallest radius of curvature of said profile constituting said ice breakage initiation zones in ice deposited on said smallest radius surfaces.

* * * * *